Figure 1:
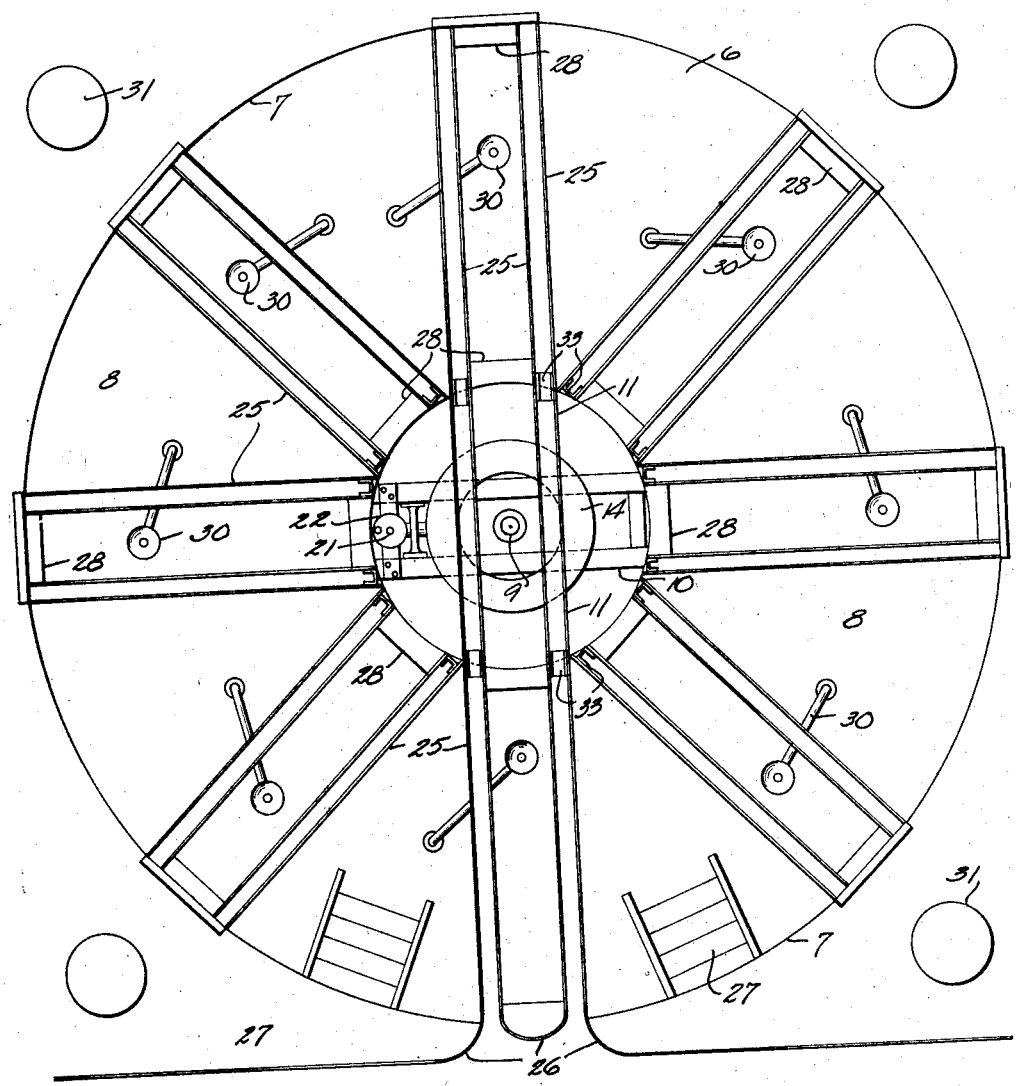

July 7, 1931.  H. A. MUGLER  1,813,460
MULTIPLE AUTOMOBILE PIT
Filed May 11, 1928   2 Sheets-Sheet 1

INVENTOR
Herman A. Mugler
BY
Wm Wallace White
ATTORNEY

July 7, 1931.                H. A. MUGLER                1,813,460
                        MULTIPLE AUTOMOBILE PIT
                          Filed May 11, 1928           2 Sheets-Sheet 2
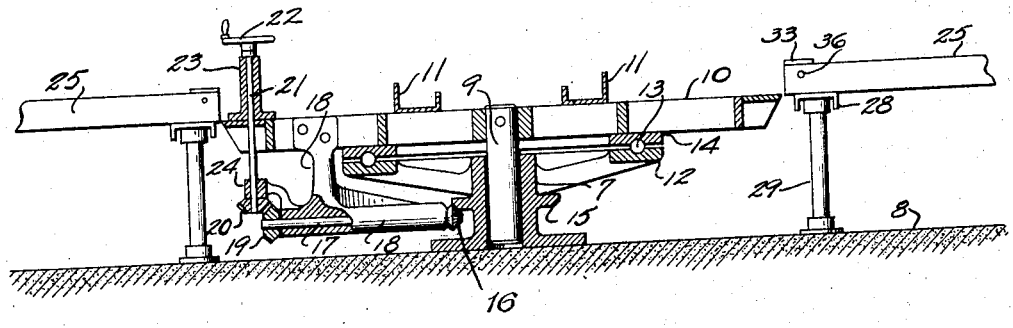
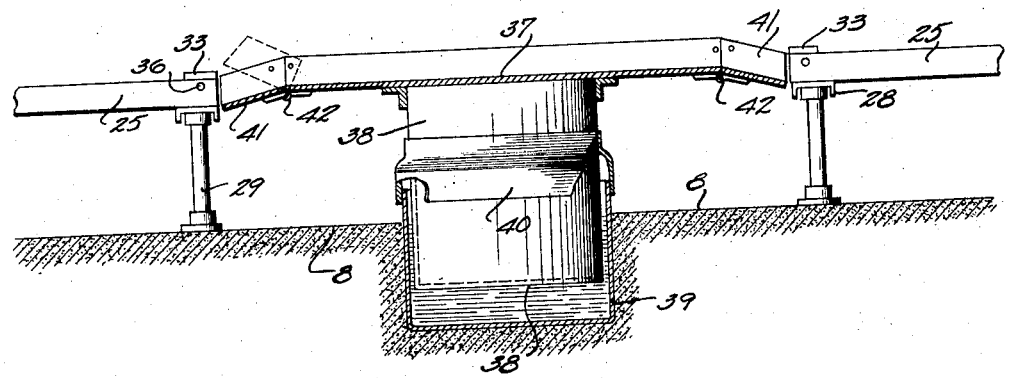
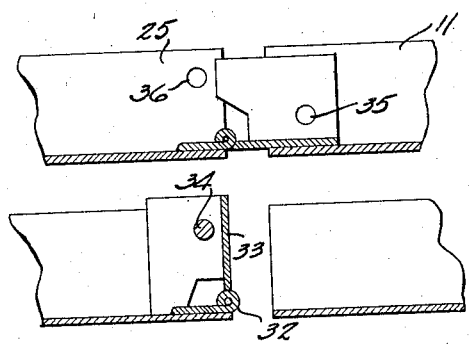
INVENTOR
Herman A. Mugler
BY
W. Wallace White
ATTORNEY Patented July 7, 1931

1,813,460

UNITED STATES PATENT OFFICE

HERMAN A. MUGLER, OF LYNBROOK, NEW YORK

MULTIPLE AUTOMOBILE PIT

Application filed May 11, 1928. Serial No. 277,012.

This invention relates to a multiple automobile pit of the type having a plurality of trackways arranged at or near the ground level and overlying a plurality of servicing positions or stations in the pit.

One object of the present invention is to provide a pit adapted to accommodate a maximum number of automobiles in a given space having a restricted front space providing access thereto.

A further object of this invention is to provide a pit having a plurality of servicing positions arranged around a central point.

Further objects of this invention are the provision of a multiple automobile pit comprising a turn-table and a plurality of servicing stations radiating therefrom, a common chamber of circular or like shape having a series of radial trackways adjacent to a trackway mounted on a turn-table, and a multiple automobile pit comprising a central turn-table provided with means whereby an automobile may be carried thereon and may be directed to any one of a series of radial servicing positions and may be reversed so that it can be driven forwardly from the pit.

With these objects in view the invention consists in the novel construction and arrangement hereinafter described, illustrated in the accompanying drawings, and particularly pointed out in the appended claims, it being understood that various changes in the form and minor details may be made without departing from the spirit of the invention or sacrificing any of the advantages thereof.

In the drawings: Fig. 1 is a plan view showing a multiple automobile pit constructed in accordance with my present invention; Fig. 2 is a vertical section through the central portion of the said pit; Fig. 3 is a view corresponding to Fig. 2 but showing a modified arrangement and Figs. 4 and 5 are detail views showing in section means for insuring proper alignment of the trackways.

Referring to Figs. 1 and 2 the multiple automobile pit has a circular excavation or common chamber 6 with a circular side wall 7 and a floor 8, which wall and floor may be lined with sheet steel or may be otherwise constructed so as to provide a smooth finish.

Mounted on the floor 8 at the center of the chamber 6 is a pedestal 7 having a bearing for the reception of a pin 9 depending from the turn-table frame 10, carrying a short trackway 11 comprising a pair of channel rails adapted to receive the wheels of the automobile, carried on the pedestal is a lower ring 12 having a ball bearing race 13 for supporting an upper ring 14 carried on the underside of the turn-table frame 10. The pedestal 7 is also formed with a bevel wheel 15 which is engaged by a bevel pinion 16 on the inner end of a radial shaft 17, carried in a bracket 18 depending from the said frame 10 and on the outer end of the shaft 17 is a bevel pinion 19 which is engaged by another bevel pinion 20 carried on the lower end of a shaft 21 having an operating hand wheel 22 and mounted in a sleeve 23 on the frame 10 and in a bracket 24 carried on the said bracket 18 in such manner that rotation of the hand wheel 22 causes the turn-table with the trackway 11 thereon to rotate about the fixed pedestal 7.

Adjacent to the said turn table and radiating therefrom are eight trackways 25 which provide accommodation for automobiles to be lubricated, inspected or repaired.

The trackway 25 at the front of the multiple automobile pit is provided with curved bumpers 26 for directing the wheels of an automobile towards the rails of the trackway and at each side of this trackway 25 a stairway 27 is provided for giving convenient access to the floor of the pit. Each of the trackways 25 is supported by a plurality of transverse beams 28 carried upon uprights 29 of tubular or other convenient form and at or adjacent to each trackway 25, servicing facilities including a lubricant receiving funnel or the like 30 are provided.

At the outside of the pit and so located as to be conveniently accessible to the automobiles on the trackways are a number of fuel supply pumps 31 or such like.

Each of the rails of each trackway 25 is provided with a hinge 32 for the attachment of a folding rail section 33 which may be turned down into the position shown in Fig. 4 so as to serve as a means for insuring proper alignment of the trackways 25 and 11 or may be folded upwardly into the position shown in Fig. 5 so as to permit relative movement of the said trackways and so as to permit of a bolt or pin 34 being passed through holes 35, 36 in the section 33 and the rails of the trackway 25 to hold the part 33 in such position and to serve as a stop means for engaging the wheels of an automobile on the trackway 25.

The modified arrangement illustrated at Fig. 3 has a turn-table comprising a pair of rails 37 mounted on a closed vertical cylinder 38 which is accommodated in a cylindrical tank 39 sunk in the floor 8 of the pit and containing oil or other liquid so that the closed cylinder 38 floats therein and a dust excluding angular flange 40 is provided on the exterior of the cylinder 38 and engages over the rim of the tank 39. At the extremities of the rails 37 short sections 41 are hinged thereto at 42 and are adapted to be turned upwardly into the position shown in dotted lines at the left hand side of Fig. 3 to retain an automobile in position on the said trackway 37.

It will be understood that in this arrangement any suitable means may be employed for turning the track 37 so as to face the automobiles in any desired direction.

Although the drawings and above description discloses suitable means of carrying out this invention it will be understood that in the practical application of this invention many changes in form and construction may be made as circumstances may require or experience suggest without departing from the spirit of the invention within the scope of the appended claims.

What I claim is:

1. A multiple automobile servicing pit comprising a common chamber below the ground level, permitting ready access to the under-mechanisms of a plurality of vehicles at the same time, a rotary trackway and a plurality of radial trackways overlying said chamber, and extending from the rotary trackway to and ending at the edge of said common chamber.

2. A multiple automobile pit comprising a common chamber, a turn-table, a trackway leading to such turn-table and a plurality of trackways extending over said chamber from the turn-table to and ending at the top edge of the pit, and servicing stations in the chamber at said trackways.

3. A multiple automobile pit comprising a central trackway, a series of radial trackways around the central trackway, a common circular chamber below the ground level and beneath said trackways, and means for rotating the central trackway to align with any of the said radial trackways.

4. A multiple automobile pit comprising a common annular chamber below ground level, a side wall for the chamber, a turn-table having a trackway at substantially ground level and a plurality of radial trackways between the said turn-table and the upper edge of the said side wall.

5. A multiple automobile pit below the ground level comprising a common circular chamber, a central turn-table above the center of the chamber, a series of spaced trackways around the said turn-table, a trackway on said turn-table and means for aligning the latter trackway with any one of the said radial trackways.

In testimony whereof I have signed my name to this specification.

HERMAN A. MUGLER.